(12) United States Patent
Do et al.

(10) Patent No.: US 9,071,724 B2
(45) Date of Patent: Jun. 30, 2015

(54) METHOD AND APPARATUS FOR PROVIDING A VIDEO CALL SERVICE

(71) Applicant: Samsung Electronics Co., Ltd., Gyeonggi-do (KR)

(72) Inventors: Tae-Won Do, Gyeonggi-do (KR); Ki-Choon Gong, Seoul (KR); Dong-Won Lee, Gyeonggi-do (KR); Sang-Ki Kang, Gyeonggi-do (KR); Kwang-Soo Jung, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 72 days.

(21) Appl. No.: 13/775,409

(22) Filed: Feb. 25, 2013

(65) Prior Publication Data

US 2013/0222516 A1    Aug. 29, 2013

(30) Foreign Application Priority Data

Feb. 24, 2012  (KR) .......................... 10-2012-0019372

(51) Int. Cl.
*H04N 7/14*       (2006.01)
(52) U.S. Cl.
CPC ............... *H04N 7/141* (2013.01); *H04N 7/147* (2013.01)

USPC .................................................. 348/333.06
(58) Field of Classification Search
USPC ................. 348/333.02, 333.06, 14.01, 14.12, 348/14.02, 14.03, 14.07
See application file for complete search history.

(56) References Cited

U.S. PATENT DOCUMENTS

| 2008/0044169 | A1* | 2/2008 | Wernersson ..................... 396/50 |
| 2010/0060792 | A1* | 3/2010 | Corlett et al. ................. 348/583 |
| 2011/0310283 | A1* | 12/2011 | Shiozaki ................. 348/333.06 |
| 2012/0086819 | A1* | 4/2012 | Wilson et al. .............. 348/207.1 |

FOREIGN PATENT DOCUMENTS

KR    10-2003-0060251 A    7/2003

* cited by examiner

*Primary Examiner* — Olisa Anwah
(74) *Attorney, Agent, or Firm* — Cha & Reiter, LLC (57) ABSTRACT

A method and an apparatus perform a video call service. A transmission communication device provides information on a rotation angle of a video call image transmitted during a video call to a reception communication device corresponding to a counterpart of the video call. Then, the reception communication device renders the received video call image by using the information on the rotation angle of the received video call image, and displays a rendered video call image. Accordingly, an image of a counterpart of the video call can be normally provided during the video call.

20 Claims, 6 Drawing Sheets

METHOD AND APPARATUS FOR PROVIDING A VIDEO CALL SERVICE

CLAIM OF PRIORITY

This application claims, pursuant to 35 U.S.C. §119(a), priority to and the benefit of the earlier filing date of Korean Patent Application Serial No. 10-2012-0019372, which was filed in the Korean Intellectual Property Office on Feb. 24, 2012, the entire content of which is hereby incorporated by reference.

BACKGROUND OF THE INVENTION

1. Field of the Invention

The present invention relates generally to a video call service, and more particularly, to a method and an apparatus for providing an optimal video call screen during a video call.

2. Description of the Related Art

Due to the development of various electronic and communication technologies in the prior art, not only voice call services but also video call services have become widespread. Also, communication devices which support video call services are being diversified. For example, video call services are provided by Personal Computers (PCs), laptop computers, tablet PCs or the like, as well as by mobile phones or smart phones.

As the communication devices which support the video call service are diversified as described above, a video call may be performed between communication devices which belong to an identical type but are of different models, or between communication devices which belong to different types.

Figure 1:
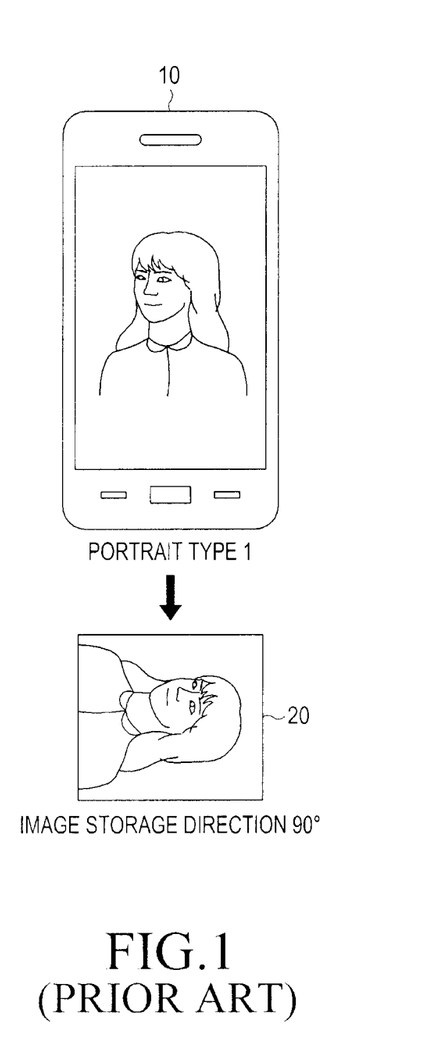
FIG. 1 and FIG. 2 are views each showing an example of an actual storage state of image data in the prior art.
Figure 2:
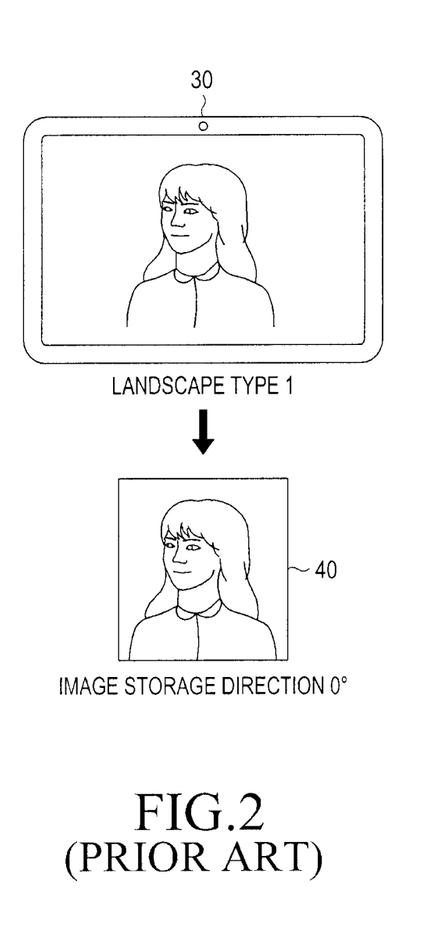

However, the communication devices may have different methods for processing video captured images, according to the types of the communication devices, or in the case of the communication devices which belong to an identical type but are of different models. Examples of the different methods in the prior art are shown in FIG. 1 and FIG. 2. Each of FIG. 1 and FIG. 2 is a view showing an example of an actual storage state of image data. In the example shown in FIG. 1, when a mobile phone 10 of a portrait type video captures a subject while the mobile phone 10 is kept in a basic state, an image obtained by video capturing the subject is normally displayed on a screen of the mobile phone 10, but actual image data 20 is stored in a storage device of the mobile phone 10 in a state of being rotated by 90 degrees in terms of the normal or basic orientation of the mobile phone 10 as a reference. Also, in another example shown in FIG. 2, when a tablet PC 30 of a landscape type video captures a subject while the tablet PC 30 is kept in a basic state, actual image data 40 obtained by video capturing the subject is stored in a storage device of the tablet PC 30 without being rotated in terms of the tablet PC 30 as a reference. In particular, according to unique features of the relevant communication device, a storage state of image data can be different for each communication device.

The image data 20 and the image data 40, which have been stored as described above, are transmitted to a counterpart communication device during a video call, without any change in states in which the image data 20 and the image data 40 have been stored. In other words, in the example shown in FIG. 1, the image data 20 rotated by 90 degrees is transmitted to a counterpart of the video call. Accordingly, a problem may occur when the communication device which has received the image data 20 displays the image data 20.

When the mobile phone 10 performs video communication with the tablet PC 30, the tablet PC 30 which receives the image data 20 displays an image rotated by 90 degrees on a screen thereof. Moreover, an image that the tablet PC 30 displays is also affected when a user does not keep the direction of the mobile phone 10 in a basic state as shown in FIG. 1 but rotates the mobile phone 10 in a clockwise direction by 90 degrees or in a counter clockwise direction by 90 degrees while the user performs the video call.

Therefore, the user is inconvenienced in that the user must manually change the direction of the displayed image.

SUMMARY OF THE INVENTION

Accordingly, an aspect of the present invention is to provide a method and an apparatus for providing an optimal video call screen during a video call.

Also, another aspect of the present invention is to provide a method and an apparatus capable of providing a normal video call image regardless of the type of communication device which performs a video call.

Further, still another aspect of the present invention is to provide a method and an apparatus capable of providing a normal video call image even when a user rotates the communication device which performs the video call.

In accordance with an aspect of the present invention, a method for providing a video call service by a communication device is provided. The method includes: connecting a video call to at least one particular communication device; receiving rotation angle information of a video call image transmitted by the particular communication device from the particular communication device; detecting a rotation angle of the communication device, with a basic state of the communication device as a reference; calculating a rendering angle of the video call image by using the rotation angle information and the rotation angle of the communication device; and rotating the video call image by the rendering angle, and displaying a rotated video call image.

In accordance with another aspect of the present invention, an apparatus for providing a video call service in a communication device which provides the video call service is provided. The apparatus includes: a controller for connecting a video call to at least one particular communication device, receiving rotation angle information of a video call image transmitted by the particular communication device from the particular communication device, detecting a rotation angle of the communication device with a basic state of the communication device as a reference, calculating a rendering angle of the video call image by using the rotation angle information and the rotation angle of the communication device, and setting the rendering angle for an image processor; and the image processor for rotating the video call image by the rendering angle, and displaying a rotated video call image.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. It should be noted that in the accompanying drawings, the same elements will be designated by the same reference numerals as far as possible although they are shown in different drawings. Also, in describing the present invention, a detailed description of publicly-known functions or configurations related to the present invention will be omitted when it is determined that the detailed description thereof may unnecessarily obscure the subject matter of the present invention. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, a normal image or an image in a normal state refers to the typical non-rotated image of a person or other subjects, such as animals, paintings, buildings, statues, etc., with the head of a person or a top of the subject near the top of the image and the lower body of the person or a lower portion of the subject near the bottom of the image As video call services are generalized, communication devices which support video call services are also being diversified. For example, video call services are provided by Personal Computers (PCs), laptop computers, tablet PCs or the like, as well as by mobile phones or smart phones.

The communication devices can be divided into a portrait-type device, such as the mobile phone 10 shown in FIG. 1, which is relatively long in the vertical direction, and a landscape-type device, such as the tablet PC 30 shown in FIG. 2, which is relatively long in the horizontal direction, according to their overall external shapes, and/or the shape or orientation of a display screen of the communication device.

In the case of a communication device of a portrait type, generally, a predetermined basic state is defined as a state in which the length of a vertical side of a display is greater than the length of a horizontal side of the display, a speaker is disposed at an upper part of the communication device, and a front surface on which a screen of the display is disposed is viewed straight in the face of the user. Also, in this case, a rotation angle of the communication device is equal to 0 degrees. The basic state is determined by a software (SW) platform, or is determined in a development stage by a manufacturer of the communication device.

Figure 3:
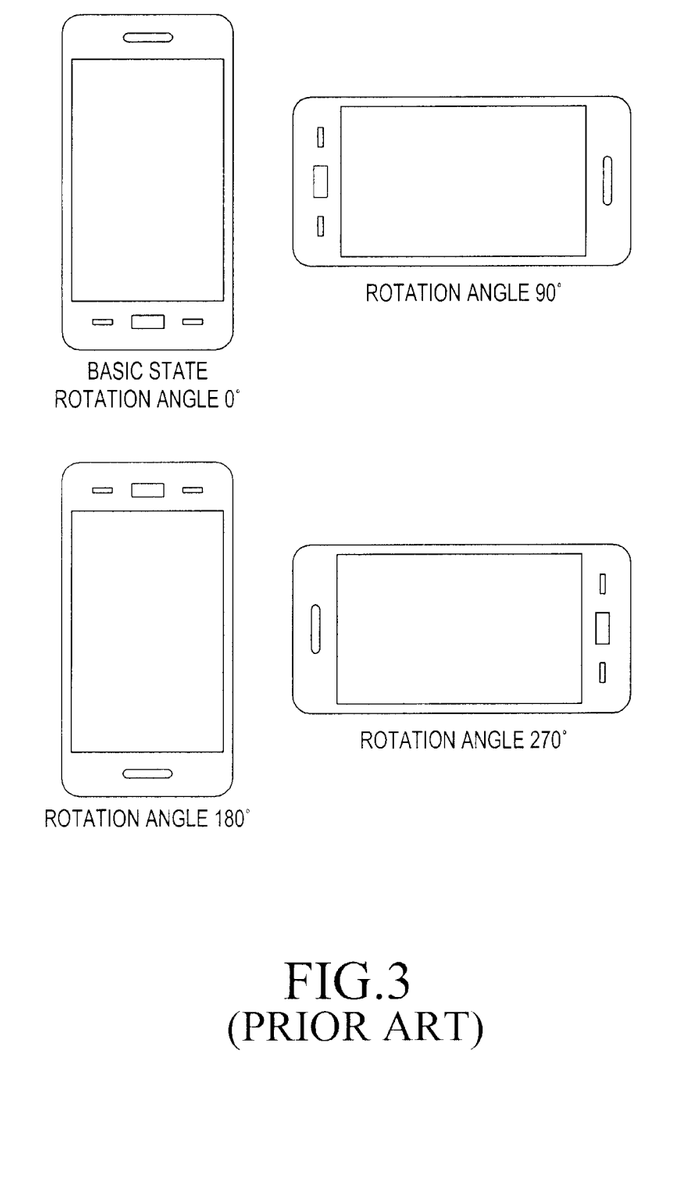
FIG. 3 is a view showing a rotation angle of a communication device of a portrait type in the prior art.

In the case of a communication device of a landscape type, generally, a basic state is defined as a state in which the length of a vertical side of a display is less than that of the length of a horizontal side of the display. Also, at this time, a rotation angle of the communication device is equal to 0 degrees. In the present invention, the device rotation angle signifies an angle by which the communication device is rotated with the basic state as a reference. An example of a rotation angle of the communication device of the portrait type in the prior art is shown in FIG. 3, which shows the portrait type communication device displayed at a rotation angle of 90 degrees, 180 degrees, and 270 degrees in a manner known in the prior art.

According to the types of the communication devices, or in the case of the communication devices which belong to an identical type but are of different models, as can be seen in the examples shown in FIG. 1 and FIG. 2, a storage direction of image data, which is set with a basic state of a communication device as a reference, may be different for each communication device.

However, the image data 20 and the image data 40, which have been stored as described above, are transmitted to a counterpart communication device during a video call, without any change in storage directions of the image data 20 and the image data 40. In other words, when the mobile phone 10 performs video communication with the tablet PC 30, the image data 20 rotated by 90 degrees is transmitted to the tablet PC 30 corresponding to a counterpart of the video call. Accordingly, a problem may occur in that the tablet PC 30 displays the image rotated by 90 degrees on a screen thereof.

Therefore, in the present invention, rotation angle information of an image (a video call image) transmitted during a video call is provided to a reception communication device corresponding to a counterpart of the video call. Then, the reception communication device renders the received video call image by using the transmitted rotation angle information of the received video call image, and displays a rendered video call image. Accordingly, an image of a counterpart of the video call can be normally provided during the video call.

In the present invention, the rotation angle information of the video call image is provided through an image storage direction and a device rotation angle of the communication device. The image storage direction is determined according to a storage direction of an image when the communication device stores the image after capturing a subject in a basic state of the communication device. For example, as in the case of the mobile phone 10 shown in FIG. 1, when a captured image is rotated by 90 degrees with a basic state of the mobile phone 10 as a reference and the rotated image is stored, an image storage direction becomes 90 degrees. As in the case of the tablet PC 30 shown in FIG. 2, when a captured image is stored without being rotated with a basic state of the tablet PC 30 as a reference, an image storage direction becomes 0 degrees. The image storage direction corresponds to a characteristic value of the communication device.

By using the image storage direction and the device rotation angle, which have been received from the counterpart device of the video call, and by using a current device rotation angle of the communication device itself, the communication device determines a rotation degree of the received video call image, and applies the determined rotation degree to the received video call image. Also, in view of the image storage direction and the device rotation angle, which have been received from the counterpart device of the video call, and in view of the current device rotation angle and a display direction of the communication device itself, the communication device determines whether the received video call image is resized, and applies a result of the determination to the received video call image.

Also, ratios of display screens included in the communication devices, such as the mobile phone 10 and the tablet PC 30, may differ from each other. For example, in the case of the mobile phone 10, a ratio of a display screen may be equal to 16:9, which is the case in which the mobile phone 10 is rotated by +90 degrees or −90 degrees, as a reference, and a ratio of a display screen of the tablet PC 30 may be equal to 4:3. In this case, in order to optimize a video call image when at least two communication devices are connected in a video call, it is desirable that each of the communication devices on each end of the video call transmits the video call image in such a manner as to satisfy a ratio of a display screen supported by each other.

Accordingly, in an exemplary embodiment of the present invention, the communication devices on each end of the video call exchange ratios of their respective display screens in the initial process of connecting a video call between the communication devices, and each of the communication devices determines a horizontal-to-vertical ratio of a video call image in a manner similar to determining a ratio of a display screen which is supported by a counterpart communication device of the video call, each of the communication devices encodes the video call image according to the determined horizontal-to-vertical ratio, and each of the communication devices transmits an encoded video call image.

For example, the mobile phone 10 encodes a video call image, which is to be transmitted to the tablet PC 30, with a ratio of 4:3, and the tablet PC 30 encodes a video call image, which is to be transmitted to the mobile phone 10, with a ratio of 16:9.

Figure 4:
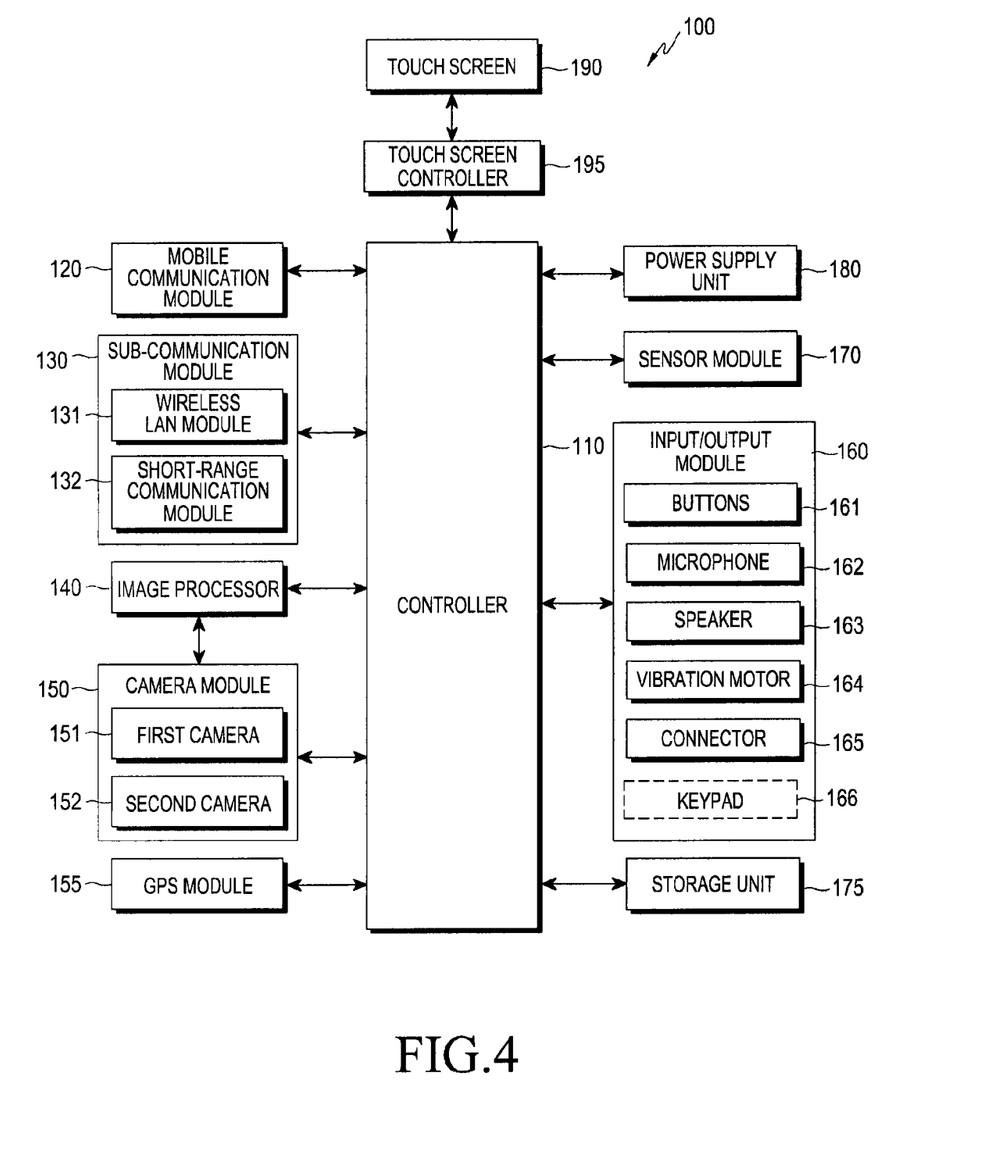
FIG. 4 is a block diagram showing the configuration of a communication device according to an exemplary embodiment of the present invention.

An example of the communication device, to which the present invention is applied, is shown in FIG. 4. FIG. 4 is a block diagram showing the configuration of the example communication device according to the exemplary embodiment of the present invention. Referring to FIG. 4, the communication device 100 may be connected to an external device by using a mobile communication module 120, a sub-communication module 130 and a connector 165. The external devices may include another device, a mobile phone, a smart phone, a tablet PC, and a server.

Referring to FIG. 4, the communication device 100 may include a touch screen 190 and a touch screen controller 195. Also, the communication device 100 may include a controller 110, the mobile communication module 120, the sub-communication module 130, an image processor 140, a camera module 150, a Global Positioning System (GPS) module 155, an input/output module 160, a sensor module 170, a storage unit 175, and a power supply unit 180. The sub-communication module 130 may include at least one of a wireless LAN module 131 and a short-range communication module 132. The camera module 150 may include at least one of a first camera 151 and a second camera 152. The input/output module 160 may include at least one of buttons 161, a microphone 162, a speaker 163, a vibration motor 164, the connector 165 and a keypad 166.

The controller 110 is a processor for controlling the operation of the communication device 100 by using, for example, a Read Only Memory (ROM) storing a control program for controlling the communication device 100 and a Random Access Memory (RAM) which stores a signal or data received from outside of the communication device 100, or which is used as a memory area for a task performed by the communication device 100. The controller 110 may include a single-core, a dual-core, a triple-core, or a quad-core processing configuration known in the art.

The controller 110 may control at least the mobile communication module 120, the sub-communication module 130, the image processor 140, the camera module 150, the GPS module 155, the input/output module 160, the sensor module 170, the storage unit 175, the power supply unit 180, the touch screen 190, and the touch screen controller 195.

According to the control of the controller 110, the mobile communication module 120 causes the communication device 100 to be connected to an external device through a mobile communication channel by using at least one antenna or multiple antennas. The mobile communication module 120 transmits and receives a wireless signal for a voice call, a video call, a Short Message Service (SMS) or a Multimedia Messaging Service (MMS) to/from a mobile phone, a smart phone, a tablet PC or another device, which has a telephone number or other identifier, such as a Uniform Resource Locator (URL), which is input to the communication device 100.

The sub-communication module 130 may include at least one of the wireless LAN module 131 and the short-range communication module 132. For example, the sub-communication module 130 may include only the wireless LAN module 131, or may include only the short-range communication module 132, or may include both the wireless LAN module 131 and the short-range communication module 132.

In response to the control of the controller 110, the wireless LAN module 131 may be connected to the Internet at a place where a wireless Access Point (AP) is installed. The wireless LAN module 131 may support a wireless Local Area Network (LAN) standard such as IEEE802.11x of the Institute of Electrical and Electronics Engineers (IEEE). According to the control of the controller 110, the short-range communication module 132 enables the communication device 100 to perform wireless short-range communication with an image forming device. Short-range communication methods may include BLUETOOTH, a short range wireless communications technology at the 2.4 GHz band, commercially available from the BLUETOOTH SPECIAL INTEREST GROUP, INC., Infrared Data Association (IrDA) protocols, etc.

Depending on performance requirements for the communication device 100, the communication device 100 may include at least one of the mobile communication module 120, the wireless LAN module 131 and the short-range communication module 132. For example, according to the performance requirements, the communication device 100 may include a combination of the mobile communication module 120, the wireless LAN module 131 and the short-range communication module 132.

According to the control of the controller 110, the image processor 140 controls operations of the cameras 151 and 152. Also, the image processor 140 performs image quality processing on image data acquired by an image sensor, changes a format of the processed image data, and outputs image data, obtained after the image quality processing and the format change, to the controller 110. The controller 110 controls the storage unit 175 so as to store the input image data. Further, the image processor 140 processes a relevant video call image during a video call according to a rendering angle and whether resizing is applied to an image, which are set by the controller 110, and outputs the processed video call image to the controller 110. Then, the controller 110 performs a control operation so as to display the input video call image on the display screen. Otherwise, according to another exemplary embodiment of the present invention, the video call image processed by the image processor 140 does not go through the controller 110, but may be directly displayed on the display screen by the image processor 140.

The camera module 150 may include at least one of the first camera 151 and the second camera 152, with each camera 151, 152 for capturing a still image or a moving image according to the control of the controller 110. Also, the first camera 151 or the second camera 152 may include an auxiliary light source, such as a flash, which provides the amount of light required to capture an image. The first camera 151 may be mounted on a front surface of the communication device 100, and the second camera 152 may be mounted on a rear surface of the communication device 100. Otherwise, the first camera 151 and the second camera 152 may be disposed in such a manner as to be adjacent to each other (for example, a distance between the first camera 151 and the second camera 152 may be greater than 1 cm. and may be less than 8 cm.), and may capture a three-dimensional still image or a three-dimensional moving image.

The GPS module 155 receives a radio wave from one or more of multiple GPS satellites in the Earth's orbit, and may calculate a location of the communication device 100 by using a Time of Arrival (TOA) from each of the GPS satellites to the communication device 100.

The input/output module 160 may include at least one of the multiple buttons 161, the microphone 162, the speaker 163, the vibration motor 164, the connector 165 and the keypad 166.

The buttons 161 may be formed on a front surface, a lateral surface and/or a rear surface of a housing of the communication device 100, and may include at least one of a power-off button, a volume button, a menu button, a home button, a back button and a search button.

According to the control of the controller 110, the microphone 162 receives a voice or sound as input, and generates a corresponding electrical signal.

In response to the control of the controller 110, the speaker 163 may output sounds matched to various signals (for example, a wireless signal, a broadcast signal, a digital audio file, a digital moving image file, and photographing data) of the mobile communication module 120, the sub-communication module 130, and the camera module 150, to the outside of the communication device 100. The speaker 163 may output a sound (for example, a button operation sound or a ringback tone matched to a telephone call) matched to a function that the communication device 100 performs. The speaker 163 may include one speaker or multiple speakers disposed at an appropriate position or appropriate positions within or on a housing of the communication device 100.

Depending on the control of the controller 110, the vibration motor 164 may convert an electrical signal into a mechanical vibration. For example, when the communication device 100 in a vibration mode receives a voice call from another device, the vibration motor 164 of the communication device 100 operates. The vibration motor 164 may include one vibration motor or multiple vibration motors mounted within or on the housing of the communication device 100. The vibration motor 164 may operate in response to a touch action of a user who touches the touch screen 190, and in response to a continuous movement of a touch on the touch screen 190.

The connector 165 may be used as an interface for connecting the communication device 100 to an external device or a power source separate from or included in the power supply unit 180. According to the control of the controller 110, through a wired cable connected to the connector 165, data stored in the storage unit 175 of the communication device 100 may be transmitted to an external device or data may be received from the external device. Through the wired cable connected to the connector 165, power may be supplied from the power source or a battery, such as a battery in the power supply unit 180, so that the battery of the communication device 100 may be charged.

The keypad 166 may receive a key input from the user in order to control the communication device 100. The keypad 166 may include a physical keypad installed on the front surface of the communication device 100 or a virtual keypad displayed on the touch screen 190. The physical keypad installed on the front surface of the communication device 100 may be excluded according to the performance or structure of the communication device 100. In the form of the virtual keypad, the keypad 166 may not be a separate component, and so the dashed lines in FIG. 4 about the keypad 166 indicate that a separate physical component as the keypad 166 is optional and may be omitted, depending on the implementation of the touch screen 190 and/or the communication device 100.

The sensor module 170 includes at least one sensor for detecting the state of the communication device 100. For example, the sensor module 170 may include a proximity sensor for detecting whether the user is close to or in contact with the communication device 100, an illuminance sensor for detecting the amount of light around the communication device 100, and a motion sensor for detecting the motion of the communication device 100 (for example, the rotation of the communication device 100, or acceleration or vibration applied to the communication device 100). At least one sensor may detect the state of the communication device 100, may generate a signal matched to the detection, and may transmit the generated signal to the controller 110. According to the performance of the communication device 100, sensors may be added to or removed from the sensor module 170. The motion sensor and other sensors may include a gyro sensor, an acceleration sensor, a compass device, and any other known sensors for detecting motion or orientation and changes thereof of the communication device 100.

According to the control of the controller 110, the storage unit 175 may store a signal or data which is input/output in response to an operation of each of the mobile communication module 120, the sub-communication module 130, the image processor 140, the camera module 150, the GPS module 155, the input/output module 160, the sensor module 170, and the touch screen 190. The storage unit 175 may store a control program for controlling the communication device 100 or the controller 110 and applications.

The term "storage unit" may include the storage unit 175, a ROM, a RAM, or a memory card, such as a Secure Digital (SD) card or a memory stick, which is mounted on the communication device 100. The storage unit may include a non-volatile memory, a volatile memory, a Hard Disk Drive (HDD), or a Solid State Drive (SSD).

According to the control of the controller 110, the power supply unit 180 may supply power to or from one battery or multiple batteries disposed in the housing of the communication device 100. The one battery or the multiple batteries supply power to the communication device 100. Also, the power supply unit 180 may supply power provided by an external power source to the communication device 100 through a wired cable connected to the connector 165.

The touch screen 190 may provide the user with a user interface matched to various services (for example, a telephone call, data transmission, broadcasting, and photographing), and thus may include a display screen. The touch screen 190 may transmit an analog signal matched to at least one touch, which is input to the user interface, to the touch screen controller 195.

Figure 5:
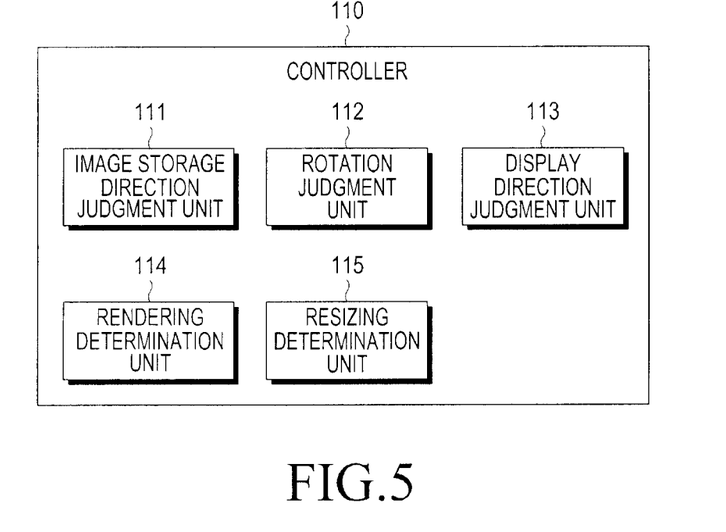
FIG. 5 is a block diagram showing the configuration of a controller according to the exemplary embodiment of the present invention.

The configuration of the controller 110 according to the exemplary embodiment of the present invention in the communication device 100, configured as described above, is shown in more detail in FIG. 5. Referring to FIG. 5, the controller 110 includes an image storage direction judgment unit 111, a rotation judgment unit 112, a display direction judgment unit 113, a rendering determination unit 114, and a resizing determination unit 115.

The image storage direction judgment unit 111 identifies an image storage direction of a camera which is used during a video call among the cameras 151 and 152 mounted on or in the communication device 100. The image storage direction corresponds to a fixed or default value, and thus may be previously stored in the storage unit 175.

Otherwise, according to another exemplary embodiment of the present invention, the image storage direction judgment unit 111 may judge an image storage direction by using a storage state of image data.

For example, when a user inputs a request for execution of a video call application, a guide message is displayed or output, for example, with an audible message, to the user which may induce the user to video capture an image, including a face of the user, for use to identify the user in the video call. Accordingly, when the user captures the face of the user, and a face image including the face is stored, the image storage direction judgment unit 111 performs face recognition on the face image, using face recognition methods known in the art. The image storage direction judgment unit 111 compares a face direction obtained from a result of performing the face recognition with a basic state of the communication device 100, and may judge a state of storing the face image. For example, in the case of the mobile phone 10 shown in FIG. 1, when the image storage direction judgment unit 111 performs face recognition on the image data 20, the image storage direction judgment unit 111 may judge that an image has been rotated by 90 degrees with a basic state of the mobile phone 10 as a reference and the rotated image has been stored.

Figure 6:
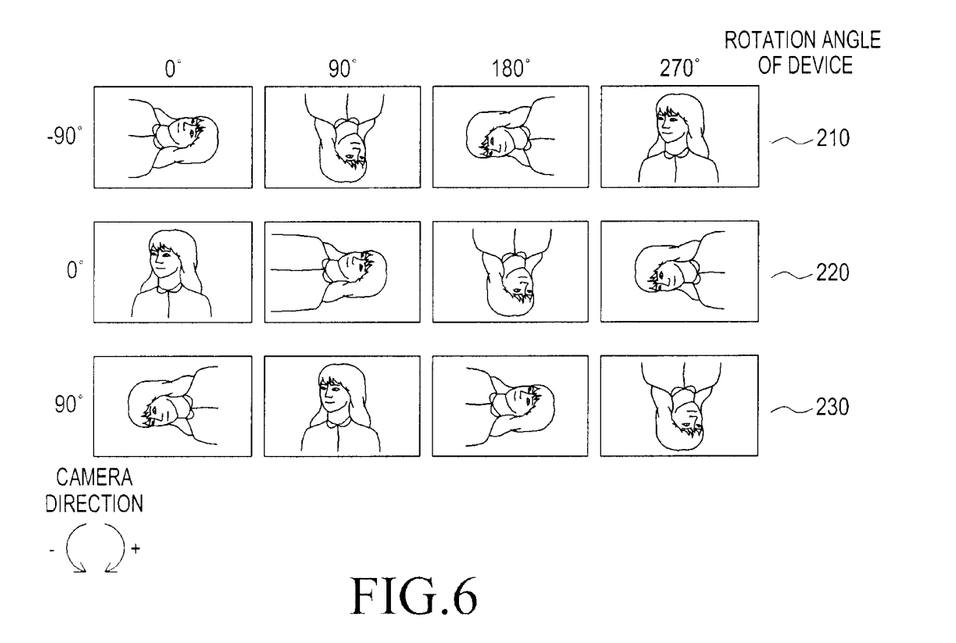
FIG. 6 is a view showing examples of various video call images.

According to another exemplary embodiment of the present invention, the user is induced, by an output text, video, or audio message or instructions, to select and input, through the touch screen 190 and/or the keypad 166, a storage direction of the captured image, and an image storage direction may be judged according to a result of the selection. In other words, when the user inputs a request for execution of a video call application, a guide message, which may induce capturing an image including a face, is provided to the user. Accordingly, when the user captures the face, and a face image including the face is stored in the storage unit 175, the image storage direction judgment unit 111 displays face images of four versions which have different rotation angles, and causes the user to select a face image in which the face is normally displayed. In particular, as shown in FIG. 6, the image storage direction judgment unit 111 displays an array of images in the case 220 of various arrays of images, with a first image in which the face is displayed in a normal direction, a second image in which the face is rotated by 90 degrees, a third image in which the face is rotated by 180 degrees, and a fourth image in which the face is rotated by 270 degrees. Then, the image storage direction judgment unit 111 compares an image, which the user has selected from among the first, second, third and fourth images, with the face image stored in the storage unit 175, and thereby may judge a state of storing the face image.

The image storage direction, identified according to the exemplary embodiment of the present invention as described above, is stored in the storage unit 175. After the image storage direction is stored, the stored image storage direction may be used without repeating the process of the judgment as described above.

The rotation judgment unit 112 detects a device rotation angle of the communication device 100, which is set with the basic state of the communication device 100 as a reference, by using a sensor value received from the sensor module 170. Then, while the video call is maintained, when the rotation judgment unit 112 judges that the communication device 100 has been rotated by ±90 degrees or more with the finally-detected device rotation angle as a reference, the rotation judgment unit 112 generates a rotation angle change event, and calculates a changed rotation angle of the communication device 100 with the basic state of the communication device 100 as the reference.

Depending on an image storage direction and a device rotation angle of the communication device 100, the state of a video call image may change as shown in FIG. 6. FIG. 6 is a view showing examples of various video call images. Referring to FIG. 6, a first case 210 having a first array of images represents video call images transmitted by the communication device 100, when device rotation angles are equal to 0 degrees, 90 degrees, 180 degrees and 270 degrees, respectively, in a case where an image storage direction of the communication device 100 is equal to −90 degrees.

The second case 220 having a second array of images represents video call images transmitted by the communication device 100, when device rotation angles are equal to 0 degrees, 90 degrees, 180 degrees and 270 degrees, respectively, in a case where an image storage direction of the communication device 100 is equal to 0 degrees.

A third case 230 having a third array of images represents video call images transmitted by the communication device 100, when device rotation angles are equal to 0 degrees, 90 degrees, 180 degrees and 270 degrees, respectively, in a case where an image storage direction of the communication device 100 is equal to 90 degrees.

The display direction judgment unit 113 identifies a display direction of an image matched to a counterpart of a video call, which is displayed on the display screen of the communication device 100 during the video call. In other words, the display direction judgment unit 113 identifies whether the image matched to the counterpart of the video call is displayed as the portrait type or as the landscape type by the communication device 100. A display direction of the image matched to the counterpart of the video call is determined according to a set value of a video call application, and the set value may be changed by the user.

The rendering determination unit 114 determines a rendering angle of a video call image received from a counterpart device of a video call during the video call. The rendering determination unit 114 calculates a rendering angle of the video call image by using information on a rotation angle (in particular, the image storage direction and the device rotation angle) of the video call image received from the counterpart device of the video call, and a device rotation angle of the communication device 100. The term "rendering angle"

refers to a rotation angle which is to be applied to the received video call image in order to enable the received video call image to be displayed in a normal state; that is, the typical non-rotated image of a person, with the head near the top of the image and the lower body near the bottom of the image. The rendering angle may be calculated by using Equation (1) below.

$$R_e = C_r - R_t - R_r \qquad (1)$$

$R_e$ represents a rendering angle, $C_r$ represents an image storage direction of a communication device which transmits a video call image, $R_t$ represents a device rotation angle of the communication device which transmits the video call image, and $R_r$ represents a device rotation angle of a communication device which receives a video call image.

The rendering determination unit 114 sets the calculated rendering angle for the image processor 140, and thereby enables the video call image to be rendered.

The resizing determination unit 115 determines whether the received video call image is resized. When the resizing determination unit 115 determines that the received video call image needs to be resized, the resizing determination unit 115 controls the image processor 140 so as to resize the received video call image, and performs a control operation so as to display a resized video call image. Whether the received video call image is resized is determined by using the image storage direction of the communication device which has transmitted the video call image, the device rotation angle of the communication device which has transmitted the video call image, and the display direction of the communication device which has received the video call image. A method which determines whether an image is resized is described in Table 1 below using pseudocode.

TABLE 1

→ If {(image storage direction) + (display direction : portrait='0' or landscape='90') − 90 + (rotation angle of transmission device) − (rotation angle of reception device)}%180 == '0,' then resizing "No"
→ otherwise, resizing "Yes"

In Table 1, the operator "%" represents the modulo operation with the modulus of 180 degrees. As used in Table 1, when the received video call image is displayed as the portrait type, a display direction becomes 0. In contrast, when the received video call image is displayed as the landscape type, the display direction becomes 90.

Table 2 to Table 4 represent rendering angles and whether each image is resized, in various cases. First, Table 2 is a table representing a rendering angle and whether an image is resized, according to a display direction of the reception device with respect to the video call image and a device rotation angle of the reception or counterpart device, when an image storage direction of the transmission device with respect to a video call image is equal to −90 degrees.

TABLE 2

| Transmission device | | Reception device | | | |
|---|---|---|---|---|---|
| | | Display directions | | Image processing | |
| Image storage direction | Rotation angles | Portrait (0)/ Landscape (90) | Rotation angles | Rendering angles | Whether image is resized |
| −90 | 0 | Portrait | 0 | −90 | No |
| | | | 90 | −180 | Yes |
| | | | 180 | −270 | No |
| | | | 270 | 0 | Yes |

TABLE 2-continued

| Transmission device | | Reception device | | | |
|---|---|---|---|---|---|
| | | Display directions | | Image processing | |
| Image storage direction | Rotation angles | Portrait (0)/ Landscape (90) | Rotation angles | Rendering angles | Whether image is resized |
| | | Landscape | 0 | −90 | Yes |
| | | | 90 | −180 | No |
| | | | 180 | −270 | Yes |
| | | | 270 | 0 | No |
| | 90 | Portrait | 0 | −180 | Yes |
| | | | 90 | −270 | No |
| | | | 180 | 0 | Yes |
| | | | 270 | −90 | No |
| | | Landscape | 0 | −180 | No |
| | | | 90 | −270 | Yes |
| | | | 180 | 0 | No |
| | | | 270 | −90 | Yes |
| | 180 | Portrait | 0 | −270 | No |
| | | | 90 | 0 | Yes |
| | | | 180 | −90 | No |
| | | | 270 | −180 | Yes |
| | | Landscape | 0 | −270 | Yes |
| | | | 90 | 0 | No |
| | | | 180 | −90 | Yes |
| | | | 270 | −180 | No |
| | 270 | Portrait | 0 | 0 | Yes |
| | | | 90 | −90 | No |
| | | | 180 | −180 | Yes |
| | | | 270 | −270 | No |
| | | Landscape | 0 | 0 | No |
| | | | 90 | −90 | Yes |
| | | | 180 | −180 | No |
| | | | 270 | −270 | Yes |

Referring to Table 2 and FIG. 6, when the transmission device having an image storage direction of −90 degrees transmits a video call image during a video call in the state of a rotation angle of 0 degrees, a first image in the first case 210 of FIG. 6 is transmitted to a counterpart device of the video call, which is the reception device. At this time, when a display direction of the reception device is portrait and a rotation angle of the reception device is equal to 0 degrees, a rendering angle of the first image is calculated as −90 degrees, and it is determined that the first image is not resized. Accordingly, the first image is rotated in a direction of −90 by the image processor 140, the rotated first image is displayed by the reception device, and thereby a correct image is displayed.

In another example, when the transmission device having an image storage direction of −90 degrees transmits a video call image during a video call in the state of a rotation angle of 90 degrees, a second image in the first case 210 of FIG. 6 is transmitted to the counterpart device of the video call, which is the reception device. At this time, when the display direction of the reception device is portrait and the rotation angle of the reception device is equal to 0 degrees, a rendering angle of the second image is calculated as 180 degrees, and it is determined that the second image is not resized. Accordingly, the second image is rotated in a direction of −180. Also, because the display direction of the reception device is portrait, the second image of the landscape type must be resized in order to meet a display state of the reception device. The resizing, for example, may be performed in such a manner as to first crop the video call image to meet a horizontal-to-vertical ratio of the display screen and then enlarge the overall cropped video call image. Otherwise, the resizing may be performed in such a manner as to enlarge a face area part to a relatively small degree and enlarge a background part to a relatively large degree in the case of performing face recognition on the received video call image.

Table 3 is a table representing a rendering angle and whether an image is resized, according to a display direction of the reception device with respect to the video call image and a device rotation angle of the reception device when an image storage direction of the transmission device with respect to a video call image is equal to 0 degrees.

TABLE 3

| Transmission device | | Reception device | | | |
|---|---|---|---|---|---|
| | | Display directions | | Image processing | |
| Image storage direction | Rotation angles | Portrait (0)/ Landscape (90) | Rotation angles | Rendering angles | Whether image is resized |
| 0 | 0 | Portrait | 0 | 0 | Yes |
| | | | 90 | −90 | No |
| | | | 180 | −180 | Yes |
| | | | 270 | −270 | No |
| | | Landscape | 0 | 0 | No |
| | | | 90 | −90 | Yes |
| | | | 180 | −180 | No |
| | | | 270 | −270 | Yes |
| | 90 | Portrait | 0 | −90 | No |
| | | | 90 | −180 | Yes |
| | | | 180 | −270 | No |
| | | | 270 | 0 | Yes |
| | | Landscape | 0 | −90 | Yes |
| | | | 90 | −180 | No |
| | | | 180 | −270 | Yes |
| | | | 270 | 0 | No |
| | 180 | Portrait | 0 | −180 | Yes |
| | | | 90 | −270 | No |
| | | | 180 | 0 | Yes |
| | | | 270 | −90 | No |
| | | Landscape | 0 | −180 | No |
| | | | 90 | −270 | Yes |
| | | | 180 | 0 | No |
| | | | 270 | −90 | Yes |
| | 270 | Portrait | 0 | −270 | No |
| | | | 90 | 0 | Yes |
| | | | 180 | −90 | No |
| | | | 270 | −180 | Yes |
| | | Landscape | 0 | −270 | Yes |
| | | | 90 | 0 | No |
| | | | 180 | −90 | Yes |
| | | | 270 | −180 | No |

Table 4 is a table representing a rendering angle and whether an image is resized, according to a display direction of the reception device with respect to the video call image and a device rotation angle of the reception device when an image storage direction of the transmission device with respect to a video call image is equal to 90 degrees.

TABLE 4

| Transmission device | | Reception device | | | |
|---|---|---|---|---|---|
| | | Display directions | | Image processing | |
| Image storage direction | Rotation angles | Portrait (0)/ Landscape (90) | Rotation angles | Rendering angles | Whether image is resized |
| 90 | 0 | Portrait | 0 | 90 | No |
| | | | 9 | 0 | Yes |
| | | | 180 | −90 | No |
| | | | 270 | −180 | Yes |
| | | Landscape | 0 | 90 | Yes |
| | | | 90 | 0 | No |
| | | | 180 | −90 | Yes |
| | | | 270 | −180 | No |
| | 90 | Portrait | 0 | 0 | Yes |
| | | | 90 | −90 | No |
| | | | 180 | −180 | Yes |
| | | | 270 | −270 | No |
| | | Landscape | 0 | 0 | No |
| | | | 90 | −90 | Yes |
| | | | 180 | −180 | No |
| | | | 270 | −270 | Yes |
| | 180 | Portrait | 0 | −90 | No |
| | | | 90 | −180 | Yes |
| | | | 180 | −270 | No |
| | | | 270 | 0 | Yes |
| | | Landscape | 0 | −90 | Yes |
| | | | 90 | −180 | No |
| | | | 180 | −270 | Yes |
| | | | 270 | 0 | No |
| | 270 | Portrait | 0 | −180 | Yes |
| | | | 90 | −270 | No |
| | | | 180 | 0 | Yes |
| | | | 270 | −90 | No |
| | | Landscape | 0 | −180 | No |
| | | | 90 | −270 | Yes |
| | | | 180 | 0 | No |
| | | | 270 | −90 | Yes |

Figure 7:
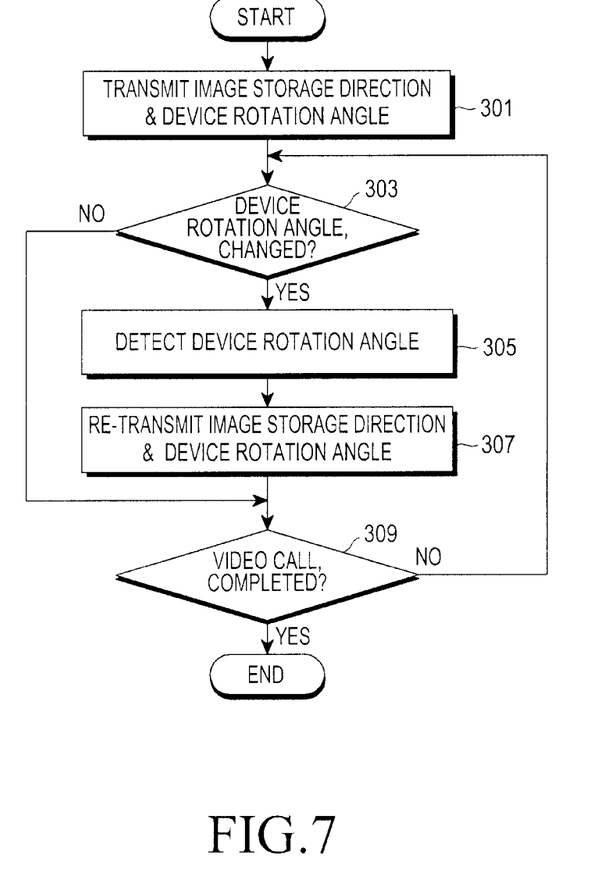
FIG. 7 and FIG. 8 are flowcharts showing operations of the communication device according to the exemplary embodiment of the present invention.

A process for transmitting a video call image during a video call, according to the exemplary embodiment of the present invention in the communication device 100 configured as described above, will be described below with reference to FIG. 7.

When a user inputs a request for execution of a video call application and a request for origination of a video call to a particular communication device, the controller 110 of the communication device 100 identifies an image storage direction of the communication device 100 through the image storage direction judgment unit 111, in step 301. Also, when the user inputs the request for the origination of the video call, the controller 110 detects a current device rotation angle of the communication device 100 through the rotation judgment unit 112. Then, the controller 110 includes the identified image storage direction and the detected device rotation angle in a control message supported by a video call service, and transmits the control message including the identified image storage direction and the detected device rotation angle to the particular communication device as the counterpart in the video call. The number of the particular communication devices may be plural.

In addition to transmitting the identified image storage direction and the detected device rotation angle, the communication device 100 includes information on a screen ratio matched to a display screen included in the communication device 100 in the control message, and transmits the control message including the information on the screen ratio to the particular communication device. Thereafter, when the particular communication device accepts the video call, the originating communication device 100 receives a control message including information on a screen ratio of a display screen supported by the particular communication device, an image storage direction of the particular communication device, and a device rotation angle of the particular communication device, from the particular communication device. Accordingly, the communication device 100 generates a video call image according to the screen ratio supported by the particular communication device, transmits the generated video call image and a voice of the video call to the particular communication device, and performs the video call. Then, in step 303, the rotation judgment unit 112 senses a change in the rotation angle of the communication device 100 by using a sensor value received from the sensor module 170. When the rotation judgment unit 112 judges that the communication device 100 has been rotated by 90 degrees or more with the finally-detected device rotation angle as a reference, in step 303, the rotation judgment unit 112 detects the device rotation angle and generates a rotation angle change event, and the controller 110 proceeds to step 305. In step 305, the rotation judgment unit 112 detects, determines, or otherwise calculates the changed device rotation angle of the communication device 100 with the basic state of the communication device 100 as the reference.

Then, in step 307, the controller 110 includes the image storage direction of the communication device 100 and the newly detected device rotation angle in a control message, and transmits the control message, including re-transmitting the image storage direction of the communication device 100 and transmitting the newly detected device rotation angle, to the particular communication device. Thereafter, the controller 110 proceeds to step 309. In step 309, the controller 110 identifies whether the video call has been completed, and ends the method of FIG. 7 once the video call is completed. Otherwise, in step 309, if the controller 110 identifies that the video call has not been completed, the controller 110 loops back to step 303 and repeatedly performs step 303 to step 309 until the completion of the video call is detected in step 309.

Referring back to step 303, if the controller 110 does not detect a change in the device rotation angle, the controller 110 proceeds directly to step 309 and skips steps 305-307.

As described above, when the video call is initiated, and while the video call is being performed, the communication device 100 transmits the image storage direction and the device rotation angle of the communication device 100 to the counterpart device of the video call, and may provide a correct video call image to the counterpart device.

Meanwhile, a process in which the communication device 100 processes a video call image, received from the counterpart device of the video call during the video call, will be described below with reference to FIG. 8.

Figure 8:
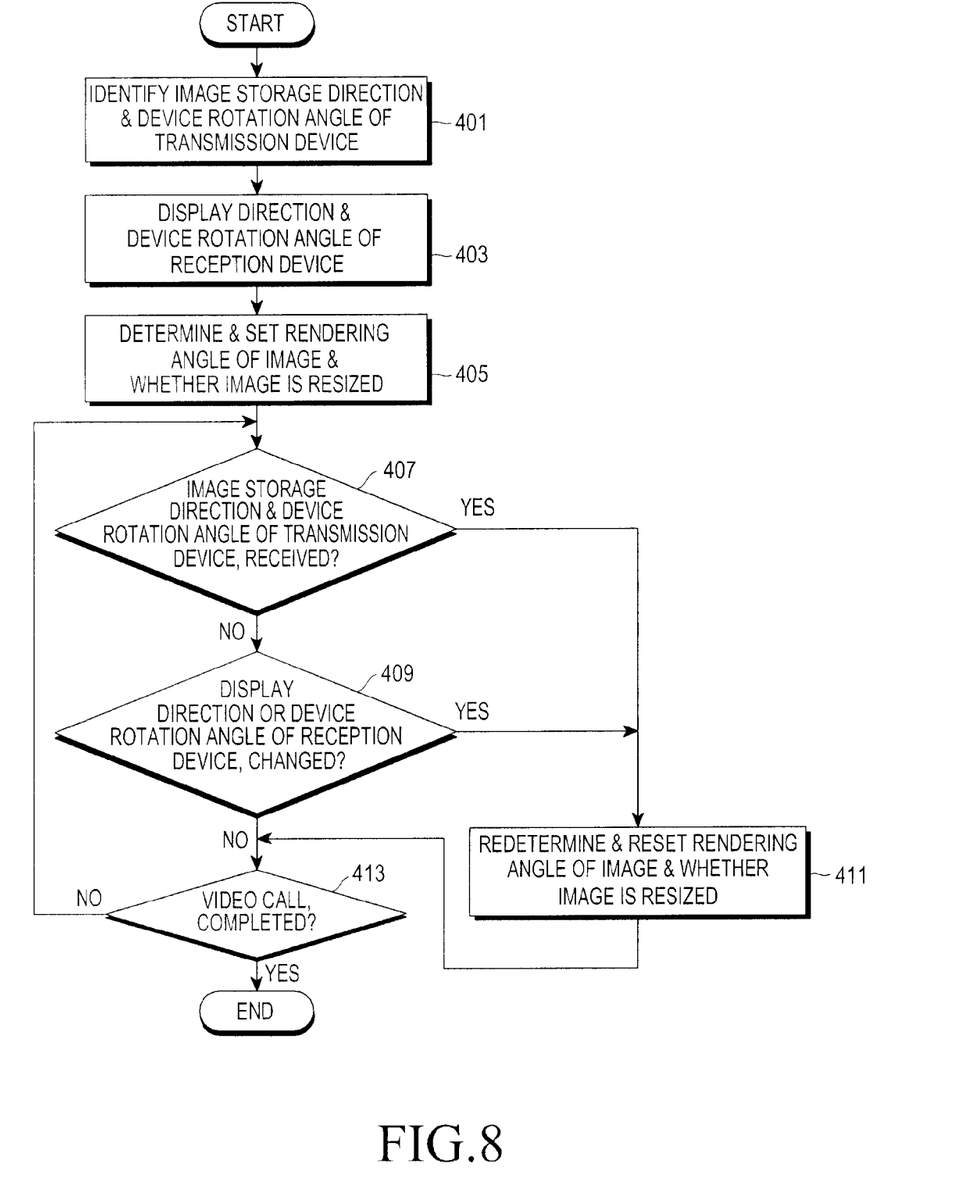

Referring to FIG. 8, in step 401, the controller 110 of the communication device 100 identifies an image storage direction and a device rotation angle which are included in a control message received from the particular communication device, which is the counterpart device of the video call. Then, the controller 110 proceeds to step 403. In step 403, the controller 110 identifies a display direction of a received video call image, which the display direction judgment unit 113 sets for a video call application of the communication device 100. Then, the controller 110 detects a current rotation angle of the communication device 100 itself, as the reception device which received the control message, through the rotation judgment unit 112. Thereafter, in step 405, the rendering determination unit 114 and the resizing determination unit 115 determine a rendering angle of the received video call image and determine whether the received video call image is resized, by using Equation (1) and the method included in Table 1, and the rendering determination unit 114 and the resizing determination unit 115 set the determined values for the image processor 140. Accordingly, the rendering determination unit 114 and the resizing determination unit 115 enable the received video call image to be rendered or resized.

Thereafter, in step 407, the controller 110 identifies whether a control message, including an image storage direction and a device rotation angle of the transmission device, is received from the counterpart device, which is the transmission device which transmits a video call image to the communication device 100. When the control message is received, the controller 110 proceeds to step 411. In step 411, the controller 110 re-determines a rendering angle of the received video call image and whether the received video call image is resized, and sets re-determined values for the image processor 140. Accordingly, the controller enables the received video call image to be rendered or resized. In particular, according to a change in the rotation angle of the transmission device, the direction of the video call image is also changed, and a process for correcting the change in the direction of the video call image is performed. The controller 110 then proceeds to step 413.

Referring back to step 407, when a result of the identification in step 407 shows that the control message is not received, the controller 110 proceeds to step 409. In step 409, the controller 110 identifies whether the display direction or the device rotation angle of the communication device 100 has been changed. The display direction of the received video call image may be changed by a user. When the display direction of the received video call image is changed, the change in the display direction of the received video call image must be considered while image processing is applied to the received video call image. When the device rotation angle of the communication device 100 is changed, the change in the device rotation angle of the communication device 100 must also be considered while image processing is applied to the received video call image. Accordingly, when the result of the identification in step 409 shows that the display direction or the device rotation angle of the communication device 100 has been changed, the controller 110 proceeds to step 411. However, in step 409, if neither of the display direction or the device rotation angle of the communication device 100 has been changed, the controller 110 proceeds to step 413.

In step 413, the controller 110 checks whether the video call has been completed. If so, the method of FIG. 8 ends. However, if the video call has not been completed, the controller 110 loops back to step 407 and repeatedly performs step 407 to step 413 until the completion of the video call is detected in step 413.

As described above, the transmission communication device provides information on a rotation angle of a video call image transmitted during a video call to the reception communication device corresponding to a counterpart of the video call. Then, the reception communication device renders the received video call image by using the information on the rotation angle of the received video call image, and displays a rendered video call image. Accordingly, an image of a counterpart of the video call can be normally provided during the video call.

Although the specific exemplary embodiments of the present invention have been described in the description of the present invention as described above, various changes and modifications may be practiced without departing from the scope of the present invention. For example, in the exemplary embodiments of the present invention, a case has been described as an example where both rendering and resizing of a video call image are considered. However, in another exemplary embodiment of the present invention, a configuration may be implemented in such a manner that a video call image is not resized and only a rendering angle is calculated before the calculated rendering angle is applied to the video call image. Also, in the exemplary embodiments of the present invention, a case has been described as an example of processing a video call image during a video call. However, this configuration may be similarly applied to a still image. For example, after a still image is first generated by each of the cameras 151 and 152, and the still images from the cameras 151, 152 are then processed by the image processor 140, tag information matched to the generated still image, which includes an image storage direction of the communication device 100 and a device rotation angle of the communication device 100 during capturing of the still image, is stored, together with the captured still image, in the storage unit 175. Then, when the still image is transmitted to another communication device, the still image is transmitted together with the relevant tag information, and another communication device processes the received still image in a process similar to the above process for processing a video call image, and displays the processed still image.

Also, the methods according to exemplary embodiments of the present invention may be implemented in the form of a program of instructions executable by various computer apparatus and methods, and may be recorded on a computer-readable medium. The computer-readable medium can include a program of instructions, data files, data structures, and the like, or a combination thereof. The program of instructions recorded on the medium may be specially designed and configured for the present invention, or may be publicly known and available to those having ordinary knowledge in the field of computer software.

According to the present invention, it is possible to provide an optimal video call screen during a video call, and in particular, it is possible to provide a normal video call image regardless of the type of communication device which performs a video call. Also, according to the present invention, it is possible to provide a normal video call image even when a user rotates the communication device which performs the video call.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

While the present invention has been shown and described with reference to certain embodiments thereof, it will be understood by those skilled in the art that various changes in form and details may be made therein without departing from the spirit and scope of the present invention. Therefore, the spirit and scope of the present invention is not limited to the described embodiments thereof, but is defined by the appended claims and equivalents thereof.

What is claimed is:

1. A method for providing a video call service by a first communication device, the method comprising:
    connecting a video call with a second communication device;
    receiving rotation angle information of a video call image transmitted from the second communication device;
    detecting a rotation angle of the first communication device, based on a reference position of the first communication device;
    identifying a rendering angle of the video call image by using the rotation angle information and the rotation angle of the first communication device;
    rotating the video call image by the rendering angle; and
    displaying, by the first communication device, the rotated video call image.

2. The method as claimed in claim 1, further comprising:
    identifying a display direction of the video call image displayed on a display screen of the first communication device, during the video call; and
    determining whether the video call image is resized, according to the rotation angle information, the rotation angle of the first communication device and the display direction; and
    applying a result of the determination to the video call image.

3. The method as claimed in claim 2, wherein the rotation angle information includes an image storage direction of the second communication device and a rotation angle of the second communication device;
    the image storage direction is determined according to a storage direction of the video call image, which is set with a predetermined basic state of the second communication device as a reference, when the second communication device stores the video call image after video capturing a subject; and
    the rotation angle of the second communication device corresponds to an angle by which the second communication device is rotated with the predetermined basic state of the second communication device as the reference.

4. The method as claimed in claim 3, wherein the rotation angle information is included in a control message supporting the video call service, and the control message including the rotation angle information is transmitted.

5. The method as claimed in claim 4, further comprising transmitting the control message including an image storage direction of the first communication device and a current rotation angle of the first communication device to the second communication device, when the device rotation angle of the first communication device is changed by +90 degrees or more or by −90 degrees or more.

6. The method as claimed in claim 4, wherein the identification of the rendering angle and the determination of whether the video call image is resized is re-performed whenever the control message is received from the second communication device.

7. The method as claimed in claim 4, further comprising re-calculating the rendering angle and re-determining whether the video call image is resized, when the device rotation angle of the first communication device is changed by +90 degrees or more or by −90 degrees or more.

8. The method as claimed in claim 4, wherein the display direction corresponds to a portrait type or a landscape type.

9. The method as claimed in claim 8, further comprising re-determining whether the video call image is resized, when the display direction is changed.

10. An apparatus for providing a video call service with an first communication device, the apparatus comprising:
   with a video call to a second communication device, receiving rotation angle information of a video call image transmitted from the second communication device, detecting a rotation angle of the first communication device, based on a reference position of the first communication device, identifying a rendering angle of the video call image by using the rotation angle information and the rotation angle of the first communication device, and setting the rendering angle
   an image processor for rotating the video call image by the rendering angle; and
   a display screen for displaying the rotated video call image.

11. The apparatus as claimed in claim 10, wherein the controller:
   identifies a display direction of the video call image displayed on the display screen of the first communication device, during the video call;
   determines whether the video call image is resized, according to the rotation angle information, the rotation angle of the first communication device and the display direction; and
   sets the identified display direction and a result of the determination for the image processor; and
   the image processor processes the video call image according to whether the video call image is resized.

12. The apparatus as claimed in claim 11, wherein the rotation angle information includes an image storage direction of the second communication device and a rotation angle of the second communication device;
   the image storage direction is determined according to a storage direction of the video call image, which is set with a predetermined basic state of the second communication device as a reference, when the second communication device stores the video call image after video capturing a subject; and
   the rotation angle of the second communication device is calculated, wherein the rotation angle of the second communication device corresponds to an angle by which the second communication device is rotated with the predetermined basic state of the second communication device as the reference.

13. The apparatus as claimed in claim 12, wherein the rotation angle information is included in a control message supporting the video call service, and the control message including the rotation angle information is transmitted.

14. The apparatus as claimed in claim 13, wherein the controller transmits the control message including an image storage direction of the first communication device and a current rotation angle of the first communication device to the second communication device, when the device rotation angle of the first communication device is changed by +90 degrees or more or by −90 degrees or more.

15. The apparatus as claimed in claim 13, wherein the calculation of the rendering angle and the determination of whether the video call image is resized is re-performed whenever the control message is received from the second communication device.

16. The apparatus as claimed in claim 13, wherein the controller re-identifies the rendering angle and re-determines whether the video call image is resized, when the device rotation angle of the first communication device is changed by +90 degrees or more or by −90 degrees or more.

17. The apparatus as claimed in claim 13, wherein the display direction corresponds to a portrait type or a landscape type.

18. The apparatus as claimed in claim 17, wherein the controller re-determines whether the video call image is resized, when the display direction is changed.

19. The method as claimed in claim 1, wherein the rotation angle information includes an image storage direction of the second communication device and a rotation angle of the second communication device.

20. The apparatus as claimed in claim 10, wherein the rotation angle information includes an image storage direction of the second communication device and a rotation angle of the second communication device.

* * * * *

UNITED STATES PATENT AND TRADEMARK OFFICE
CERTIFICATE OF CORRECTION

PATENT NO. : 9,071,724 B2  
APPLICATION NO. : 13/775409  
DATED : June 30, 2015  
INVENTOR(S) : Tae-Won Do et al.

Page 1 of 1

It is certified that error appears in the above-identified patent and that said Letters Patent is hereby corrected as shown below:

IN THE CLAIMS

Column 19, Claim 10, Lines 16-17 should read as follows:
--...service with a first...--

Column 19, Claim 10, Line 18 should read as follows:
--...a controller for connecting a video call with a second communication device...--

Column 19, Claim 10, Lines 26-27 should read as follows:
--...rendering angle; an image...--

Signed and Sealed this
Twentieth Day of October, 2015

Michelle K. Lee
*Director of the United States Patent and Trademark Office*